United States Patent
Dinsing et al.

(10) Patent No.: US 10,735,593 B1
(45) Date of Patent: Aug. 4, 2020

(54) COMMUNICATION SYSTEM

(71) Applicant: Rohde & Schwarz GmbH & Co. KG, Munich (DE)

(72) Inventors: Karl Dinsing, Munich (DE); Hanspeter Burger, Munich (DE); Markus Eiber, Munich (DE); Thomas Richter, Munich (DE); Phillipp Specht, Munich (DE); Matthias Haubs, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/368,523

(22) Filed: Mar. 28, 2019

(51) Int. Cl.
| | |
|---|---|
| *H04W 4/90* | (2018.01) |
| *H04M 3/523* | (2006.01) |
| *H04M 3/42* | (2006.01) |
| *H04M 3/51* | (2006.01) |
| *H04L 12/58* | (2006.01) |
| *H04W 4/06* | (2009.01) |
| *H04W 4/029* | (2018.01) |

(52) U.S. Cl.
CPC ........ *H04M 3/5233* (2013.01); *H04L 51/046* (2013.01); *H04M 3/42348* (2013.01); *H04M 3/5116* (2013.01); *H04W 4/029* (2018.02); *H04W 4/06* (2013.01); *H04W 4/90* (2018.02)

(58) Field of Classification Search
CPC .. H04M 3/5233; H04M 3/42348; H04W 4/90
See application file for complete search history.

(56) References Cited

U.S. PATENT DOCUMENTS

| | | | | |
|---|---|---|---|---|
| 2006/0252444 A1* | 11/2006 | Ozugur | ............... | H04M 3/46 455/519 |
| 2008/0267360 A1* | 10/2008 | Spector | ............ | H04M 3/42348 379/45 |
| 2011/0117878 A1* | 5/2011 | Barash | ................. | H04W 4/90 455/404.2 |

FOREIGN PATENT DOCUMENTS

| | | |
|---|---|---|
| CN | 104548352 A | 4/2015 |
| CN | 105956742 A | 9/2016 |
| CN | 106485637 A | 3/2017 |
| TW | 201439948 A | 10/2014 |
| WO | 99/33249 A1 | 7/1999 |
| WO | 2004/36851 A2 | 4/2004 |

\* cited by examiner

*Primary Examiner* — Myron Wyche
(74) *Attorney, Agent, or Firm* — Christensen O'Connor Johnson Kindness PLLC

(57) ABSTRACT

A communication system comprises a transmitter and a group of recipients. The transmitter is configured to transmit a message and/or a command to the group of recipients. The system is configured to analyze sensor data assigned to each recipient of the group of recipients. The system is further configured to automatically select one recipient of the group of recipients based on the sensor data analyzed. The selected recipient is configured to automatically respond to the transmitted message and/or command. The system is further configured to automatically rank all recipients of the group. Moreover, other communication systems are described.

14 Claims, 2 Drawing Sheets

COMMUNICATION SYSTEM

FIELD OF THE DISCLOSURE

Embodiments of the present disclosure generally relate to a communication system comprising a transmitter and a group of recipients. Further, embodiments of the present disclosure generally relate to a communication system comprising a transmitter and at least one recipient. Moreover, embodiments of the present disclosure relate to a communication system comprising a transmitter that has at least two transmitter accounts.

BACKGROUND

Nowadays, communication systems are used in different technical fields, as they ensure to exchange data directly in an efficient manner. The communication systems typically comprise several participants such that a command or a message may be transmitted to a single participant of the communication system or rather a group of participants. This might depend on the kind of message or command transmitted by the transmitter.

However, several different problems arise with regard to communication within a communication system since certain messages or commands shall be sent to only one participant of the communication system that is, however, unknown to the transmitter. For instance, a message or rather command shall be transmitted to the next suitable participant of the communication system such that it is ensured that the respective message or rather command can be processed in the desired manner. In the state of the art, the problem mentioned above is solved by a manual routing over a central unit of the communication system that knows which participant is the right one that shall receive the command or rather message transmitted.

Moreover, a person interacting with the transmitter might be interested with regard to the status of the command or rather message sent in order to monitor whether the command or rather message is realized as desired or not. In the state of the art, communication systems are known that indicate the receipt status as well as the read status a message transmitted. However, no information with regard to the progress is submitted.

Furthermore, modern communication systems enable a user to use different accounts for communicating with different groups via a single communication device by manually selecting a certain account such as an e-mail account. Typically, a manual dropdown menu is used that enables the user of the transmitter to select manually a certain account.

It becomes obvious that the solutions known so far do not provide efficient communication.

Accordingly, there is a need for a communication system that simplifies communication in a communication system.

SUMMARY

Embodiments of the present disclosure provide a communication system. The communication system in some embodiments comprises a transmitter and a group of recipients. The transmitter is configured to transmit a message and/or a command to the group of recipients. In other words, the transmitter is configured to transmit at least one of a message and a command. The system is further configured to analyze sensor data assigned to each recipient of the group of recipients. The system is also configured to select automatically one recipient of the group of recipients based on the sensor data analyzed. The selected recipient is configured to respond automatically to the transmitted message and/or command. The system is further configured to rank all recipients of the group automatically.

Accordingly, the communication system is enabled to identify the most suitable recipient out of the group of recipients automatically by analyzing sensor data that is assigned to each recipient of the group of recipients. Thus, it is analyzed which of the different recipients may be the best match for the respective message and/or command transmitted by the transmitter.

The sensor data may comprise data related to the position of each recipient of the group of recipients. Thus, it is possible to identify the nearest recipient out of the group of recipients.

The system may analyze the message and/or command so that the message and/or command is also taken into account when searching the most suitable recipient from the group of recipients. For instance, content of the message and/or command as well as the sensor data are analyzed together in order to identify the recipient out of the group of recipients that is the best one for the particular message or rather command.

Therefore, the communication system ensures to find the right recipient, for instance contact person.

The respective recipient may respond based on predefined parameters.

The parameters may depend on the status of the recipient, the sensor data taken into account and/or the kind of message or rather command transmitted. Hence, the type of automatic response depends on certain parameters that are predefined. Thus, a certain response is outputted automatically if the certain parameters or rather criteria will be fulfilled. For instance, these parameters may relate to capabilities to satisfy a request assigned to the message or rather command.

Generally, the predefined parameters and the sensor data that is analyzed may be equal at least partly.

According to an example, a medical support is requested by the message and/or command transmitted so that the communication system is enabled to identify the nearest and suitable medical team or medical team member that is enabled to provide the medical support requested.

Since a certain medical team that may be located nearest may be occupied by another emergency, which is noticed by analyzing the respective sensor data assigned to the recipient, the next nearest and suitable medical team may be forwarded to the transmitter.

While responding to the respective message and/or command transmitted, the recipient may check previously whether the recipient is capable of providing the respective service requested, for instance the medical support requested.

The system further ranks all recipients of the group automatically based on the sensor data analyzed (and optionally the content of the message and/or command transmitted).

Generally, the communication system is configured to process automatically the message and/or command and to respond automatically to the message and/or command based on automatically sensed sensor data that is analyzed. Accordingly, no manual routing is necessary, as was the case for an emergency call.

The processing of the message and/or command may be implemented in a software module that receives the message and/or command while having access to the recipient of the communication system, for example the sensor data. The software module in some embodiments includes computer executable instructions, that when executed on one or more computing devices, such as a processor, microprocessor, processing engine, or the like, processes the message and/or command.

According to an aspect, the automatic response is assigned to an acceptance or a deny. Thus, the recipient may accept the message or rather command so that the transmitter receives a response according to which the recipient is enabled to provide a service that is assigned to the message or rather command transmitted. Alternatively, the recipient may deny the respective service due to any restrictions.

As mentioned above, the response may be forwarded automatically based on predefined parameters. Thus, the recipient automatically verifies its status wherein the predefined parameters are taken into account in order to accept or to deny the message and/or the command.

Another aspect provides that at least one recipient of the group of recipients is configured to provide a manual interaction such that a manual response is outputted. In other words, the manual interaction may overwrite the automatically analyzed information such that at least one recipient of the recipients will response in a certain way that was set manually. For instance, a medical team may provide emergency services in any case so that the manual interaction ensures that a response of the specific medical team relates to an acceptance. However, the manual interaction may also relate to a deny such that the respective recipient responds by denying the command or rather message.

In some embodiments, the transmitter comprises a positioning or location module. The positioning or location module may be related to a global navigation satellite system (GNSS) module such as a global positioning system (GPS) module such that the transmitter provides information with regard to its own position. Therefore, the communication system is enabled to identify the nearest recipient with respect to the transmitter while analyzing the positioning data of the transmitter itself.

For instance, the transmitter is established by a mobile device. The mobile device may relate to a smartphone, a mobile or any other mobile device that comprises communication functionality, for instance a tablet. In some embodiments, the mobile device includes a GPS or other positioning module. For example, the mobile device in one embodiment includes circuitry, such as a receiver, and signal processing functionality, either implemented in circuitry or software, for processing the received location data.

In some embodiments, the mobile device has a telephone module. Thus, the mobile device may be established by a smartphone or rather a mobile phone, such as a cellular phone.

Another aspect provides that the system is configured to set up a hunting group automatically based on status information of the recipients of the group of recipients. A hunting group is generally assigned to a so-called line hunting or hunt group according to which phone calls are distributed from a single telephone number to a group of several phone lines in order to identify a suitable recipient out of the group of recipients. The hunting group may relate to a multi-line hunting, a linear hunting, a most-idle hunting or rather a circular hunting.

Furthermore, the system may comprise a deputy or replacement management module that is configured to provide a deputy or replacing recipient from the group of recipients. The deputy or replacing recipient may replace a certain recipient within the automatically ranked recipients. The respective deputy or replacing recipient may be set manually or automatically based on sensor signals received, for example the sensor data or rather the predefined parameters.

Thus, the communication system may have an automatic recipient selection unit. Depending on the status of the recipients and optionally on the content of the message and/or command, the communication system is enabled to select a certain recipient out of the group of recipients automatically that is the most suitable one for the specific scenario.

Generally, the recipients may also relate to mobile devices wherein their status is analyzed when the sensor data is analyzed.

The sensor data may correspond to a status of the respective recipient, for instance a service (capability).

Further, embodiments of the present disclosure provide a communication system that comprises a transmitter and at least one recipient that has at least one sensor and a command progress calculation module. The transmitter is configured to transmit a command to the at least one recipient. The transmitted command comprises a sensor activation signal configured to activate the at least one sensor of the at least one recipient. The command progress calculation module is configured to calculate the command progress on the at least one recipient. The at least one recipient is configured to transmit a response indicating the command progress on the recipient.

Accordingly, the communication system comprises a digital command-monitoring unit since the progress of the command transmitted is monitored in a digital manner, as the recipient calculates the progress by its own. Further, the recipient is configured to transmit the command progress calculated to the transmitter such that a user of the transmitter is informed about the progress of the command submitted. Hence, the user of the transmitter obtains more information than just a transmission status and a reading status, as the progress related to the command transmitted is calculated and transmitted to the transmitter.

In general, the command initiates an action on the receiver so that a certain progress of the action assigned to the command (command progress) can be verified. This command progress is calculated, for instance as a percentage value.

The command progress may be displayed on the transmitter by a progress bar.

In general, an automatic overview is provided for the user of the transmitter that indicates the fulfillment or rather the progress of a transmitted command.

According to an aspect, the sensor activation signal encompassed in the command transmitted is predefined or set manually by user interaction. Thus, the user may select which sensor on the recipient shall be activated by the command that encompasses the sensor activation signal. Alternatively, at least one predefined sensor activation signal may be encompassed in the command such that the at least one sensor assigned thereto is activated.

For instance, a sensor providing information with regard to the actual computational power on the recipient is activated in order to derive at the command progress due to the actual computational power and/or a duration that the computational power exceeds a certain threshold.

The command may be a message in a messenger service. Thus, a message may be transmitted in the respective messenger service that initiates a certain action on the recipient, the progress of which is digitally monitored by the transmitter.

Furthermore, embodiments of the present disclosure provide a communication system that comprises a transmitter with at least two transmitter accounts. The transmitter is configured to analyze a message to be transmitted. The transmitter further comprises a selection module that is configured to select one of the at least two transmitter accounts for transmitting the message based on the analysis of the message to be transmitted.

Accordingly, an automatic selection of transmitter accounts is provided wherein the selection is based on analyzing the message to be transmitted. Thus, it is no more required that a user selects the respective transmitter account by its own while interacting with a dropdown menu or similar. Therefore, it is prevented to transmit a message by a wrong transmitter account.

An aspect provides that the selection module is configured to select the transmitter account based on at least one of message type, message content, a predefined sign in the message, a receiver address and a subject of the message. Therefore, the message to be transmitted is analyzed with regard to its type, content, a certain sign, the receiver address or rather the subject of the message in order to identify any hint that is used for selecting the respective transmitter account. For instance, header or rather body information of the message to be transmitted is taken into account for analyzing which of the at least two transmitter accounts shall be used.

Another aspect provides that the message type is set manually and/or defined by different optical signs. Thus, the user may set the kind or rather type of the message manually, for instance by using a certain messenger service. Alternatively, the type of message is detected automatically by analyzing the visual or rather optical signs assigned to the message.

For instance, the transmitter account may correspond to an e-mail account that is selected automatically.

The automatic selection may be based on a sign in the e-mail text (body information), the recipient, subject, date or time (header information) or rather the message type which may be set by a messenger service selected.

Generally, all aspects mentioned above can be combined in any manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
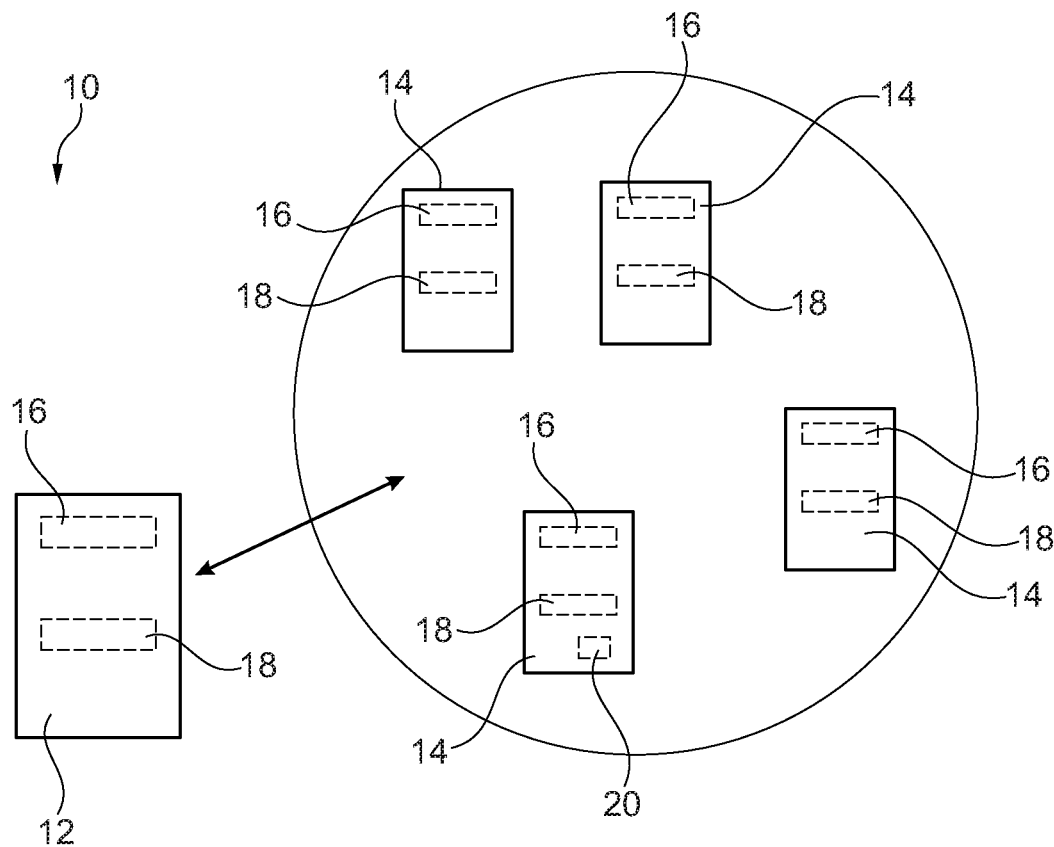
FIG. 1 schematically shows a representative embodiment of a communication system according to the present disclosure, FIG. 2 schematically shows another representative embodiment of a communication system according to the present disclosure, and FIG. 3 schematically shows another representative embodiment of a communication system according to the present disclosure.

In FIG. 1, a communication system 10 is shown that comprises a transmitter 12 and a group of recipients 14. The transmitter 12 as well as the recipients 14 are established by mobile devices, for instance a mobile phone, such as a smartphone having a telephone module 16 and a positioning module 18.

The transmitter 12 is configured to transmit a message and/or a command to the group of recipients 14 in order to identify at least one suitable recipient 14 within the group. Therefore, the system 10 analyzes sensor data assigned to each recipient 14 of the group of recipients 14 to retrieve information with regard to the status, the position and other suitable information required with respect to each recipient 14 of the group of recipients 14.

As mentioned above, the transmitter 12 as well as each recipient 14 may have its own positioning module 18. Thus, (relative) position information may be obtained in order to identify the nearest located recipient 14 within the group with respect to the transmitter 12. In some embodiments, the positioning module 18 includes a GPS receiver and associate software or hardware for processing of location data received thereby.

The system 10 may further analyze the message and/or command transmitted by the transmitter 12 in order to obtain information with regard to the content of the message or rather command. A request may be assigned to the message and/or command transmitted that is analyzed.

For instance, the transmitter 12 may transmit a message/command according to which medical support is required. The system 10 analyzes the kind of message identifying the request of medical support.

Further, the system 10 analyzes the locations or rather positions of the recipients 14 with respect to the transmitter 12 that is provided by the respective positioning module 18. Furthermore, the system 10 may retrieve information (sensor data) of the individual recipients 14. The information (sensor data) may indicate whether the respective recipient 14 is able to provide the service requested, for instance the medical support required. The sensor data or rather information of the individual recipients 14 may relate to the status of the respective recipient 14.

Then, the system 10 automatically selects one recipient 14 out of the group of recipients 14 based on the sensor data analyzed (and optionally the analysis of the message and/or command) that is the most suitable one. In one embodiment, the transmitter 12 automatically selects one recipient 14 out of the group of recipients 14 based on the sensor data analyzed (and optionally the analysis of the message and/or command) that is the most suitable one.

The respective recipient selected automatically responds to the transmitted message and/or command based on predefined parameters, for instance occupancy information or rather service capabilities of the respective the recipient 14. This means that information is submitted whether or not the recipient 14 is able to provide the service required, for instance the medical support.

The response may be assigned to an acceptance or a deny so that the transmitter 12 is informed whether or not the selected recipient 14 is able to provide the respective service required by the transmitter 12. Alternatively, the response is not forwarded to the transmitter 12 directly, but processed by the system 10.

In any case, the communication system 10 automatically ranks all recipients 14 of the group of recipients 14 depending on the sensor data analyzed (and optionally the analysis of the message and/or command) as well as the predefined parameters. Thus, a certain order of recipients 14 is obtained as the recipients 14 are ranked with regard to certain criteria applied, for instance occupancy and/or a distance to the transmitter 12. Put another way, the sensor data may relate to the general availability for a service requested by the message or rather command, whereas the predefined parameters influencing the type of automatic response relate to the current availability that may differ to due shortages with regard to the capacities.

In the shown embodiment of FIG. 1, at least one recipient 14 may be configured to provide a manual interaction such that a manual response is outputted. For instance, the manual interaction may relate to an acceptance that shall be outputted as a response. Hence, at least one of the recipients 14 accepts the message and/or command transmitted.

Furthermore, the system 10 may automatically set up a hunting group based on status information of the recipients 14 of the group of recipients 14. Accordingly, phone calls may be distributed from a single telephone number to a group of several phone lines wherein an algorithm is used to select which phone line of the several phone lines will receive the call.

In general, the status information of the recipients 14 of the group of recipients 14 is taken into account for selecting the most suitable recipient 14 or for setting up the hunting group.

In addition, the system 10 may comprise a deputy or replacement management module 20 that is configured to provide a deputy or replacing recipient 14 from the group of recipients 14 that replaces another recipient 14. The respective replacement management module 20 may communicate with each of the recipients 14 in order to identify the replacing recipient 14 as well as the recipient 14 that shall be replaced.

In some embodiments, the availability of the recipients 14 is taken into account by the deputy or replacement management module 20. Thus, scheduling or rather ranking may be ensured by the deputy or replacement management module 20.

In the sown embodiment, the deputy or replacement management module 20 is incorporated in one of the recipients 14. Generally, each of the recipients 14 may comprise the deputy or replacement management module 20. Alternatively, the deputy or replacement management module 20 is separately formed.

In some embodiments, the communication system 10 automatically processes the command/message, which is faster than a manual routing of the message/command.

Generally, the processing may be implemented by, for example, a software module so that no emergency staff is required for directing an emergency call to the respective medical team.

Figure 2:
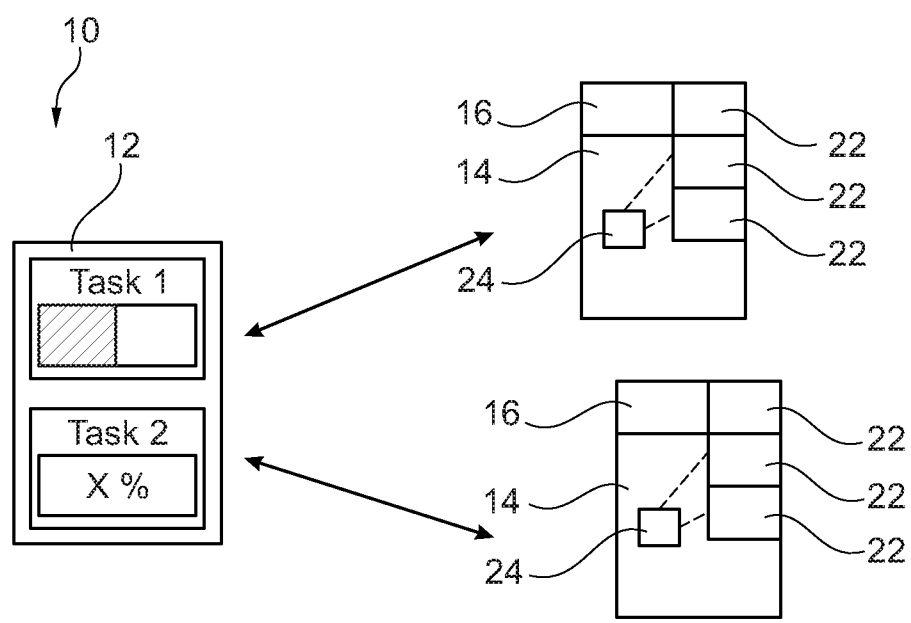

In FIG. 2, another aspect of the same communication system 10 is shown in detail. At least one of the recipients 14 that has several sensors 22 as well as a communication progress calculation module 24 assigned to the sensors 22.

The transmitter 12 transmits a command to the at least one recipient 14 wherein the respective command is processed by the recipient 14. In other words, the command received by the at least one recipient 14 initiates an action.

The command transmitted comprises a sensor activation signal that activates at least one of the sensors 22 of the recipient 14 that has received the command wherein the sensor 22 provides information with respect to the sensed part of the recipient 14.

The command progress calculation module 24 calculates the command progress on the recipient 14 that has received the command while retrieving sensor data from the at least one sensor 22 that was activated previously by the command received.

The recipient 14 is configured to transmit a response to the transmitter 12 that indicates the command progress to the transmitter 12 such that a user of the transmitter 12 is informed about the progress of the command transmitted, namely the action assigned to the command.

The information with regard to the command progress may be displayed by a progress bar or a percentage value on a display of the transmitter 12 as shown in FIG. 2. Hence, the user can estimate how long it will take until the respective action is fulfilled completely.

The sensor activation signal encompassed in the command transmitted may be predefined or set manually by user interaction. Thus, the user of the transmitter 12 is enabled to activate a certain sensor 22 at the recipient 14. Furthermore, the command may relay to a message in a messenger service that runs on the mobile device. Thus, the message may initiate a certain action at the recipient 14 that receives the respective message.

Generally, an automatic overview about the fulfillment of the command transmitted is established that provides the information to the user of the transmitter 12.

Figure 3:
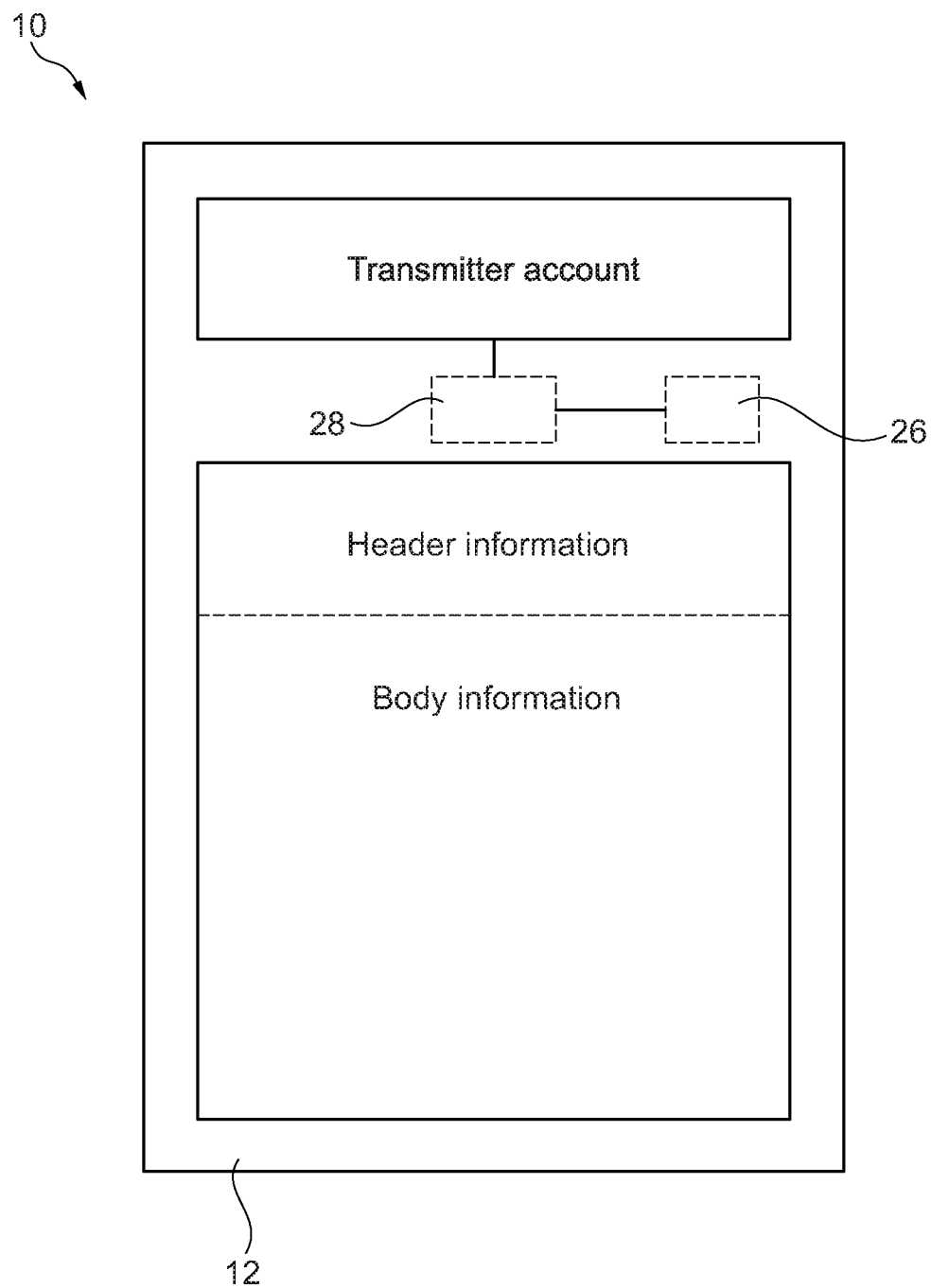

In FIG. 3, another aspect of the communication system 10 is shown. The transmitter 12 has at least two transmitter accounts that can be used by a processing unit 26 for communicating purposes. The processing unit 26 can include, for example, circuitry, a processor, a FPGA, a ASIC, or the like, and any associated programming/memory for carrying out any processing, calculating, determining, generating and/or causing any signals to be transmitted as described herein.

The transmitter 12 is configured to analyze a message to be transmitted to one of the recipients 14, for instance header information of the message, namely the recipient, the subject, the date or the time, and/or body information of the message, namely the content of the message.

The transmitter 12 has a selection module 28 that is configured to select one of the at least two transmitter accounts for transmitting the respective message. The selection module 28 interacts with the processing unit 26 that may also analyze the message to be transmitted.

Accordingly, the respective transmitter account is selected based on the analysis of the message to be transmitted.

In general, the selection module 28 is configured to select the transmitter account based on at least one of message type, message content, a predefined sign in the message, a receiver address and a subject of the message. All this information may be encompassed in the header information and/or the body information. Thus, the message to be transmitted is analyzed with regard to a certain parameter that provides information with regard to the transmitter account that shall be used.

The processing unit 26 of the transmitter 12 is configured to obtain the respective information from the message while analyzing the message.

For instance, the message type may be set manually by a user of the transmitter 12, for example by using a certain messenger service.

Alternatively or additionally, the message type may be defined by different optical signs that can be distinguished by the processing unit 26 and/or the selection module 28 in an automatic manner.

It will be understood that the transmitter 12, the recipients 14, and/or one or more of the modules and/or units, such as deputy or replacement management module 20, communication progress calculation module 24, manipulation module 14, selection module 28, process command module, telephone module, etc., described above may include, in some embodiments, logic for implementing the technologies and methodologies described herein. This logic of any one or more of these components can be carried out in either hardware or software, or a combination of hardware and software. In an example, the functionality of any one or more of these components could be implemented by special purpose hardware-based computer systems or circuits, etc., or combinations of special purpose hardware and computer instructions. In some embodiments, any one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, any one or more of these components include a microprocessor and a memory storing logic modules and/or instructions. In an embodiment, any one or more of these components include one or more ASICs having a plurality of predefined logic components. In an embodiment, any one or more of these components include one or more FPGA having a plurality of programmable logic components. In an embodiment, any one or more of these components includes combinations of circuits and computer program products having software or firmware instructions stored on one or more computer readable memories that work together to cause a device to perform one or more methodologies or technologies described herein. In an embodiment, any one or more of these components includes hardware circuits (e.g., implementations in analog circuitry, implementations in digital circuitry, and the like, and combinations thereof) for carrying out the functionality described herein.

It will be appreciated that one or more aspects of the technology and methodology set forth herein can be carried out in a computer system. In this regard, one or more program elements are provided, which are configured and arranged when executed on a computer to process, calculate, determine, generate and/or cause any signals to be transmitted or received as described herein.

The one or more program elements may be installed in memory, such as computer readable storage medium. The computer readable storage medium may be any one of the computing devices, modules, instruments, analyzers, displays, units, etc., described elsewhere herein or another and separate computing device, modules, instruments, analyzers, displays, units, etc., as may be desirable. The computer readable storage medium and the one or more program elements, which may comprise computer-readable program code portions embodied therein, may further be contained within a non-transitory computer program product.

As mentioned, various embodiments of the present disclosure may be implemented in various ways, including as non-transitory computer program products, computer readable instructions, etc. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system.

In some embodiments, one or more computer-readable storage media is provided containing computer readable instructions embodied thereon that, when executed by one or more computing devices (contained in or associated with any one of the components set forth above), cause the one or more computing devices to perform the actions or methods described herein. Of course, in other embodiments, one or more of these action or method steps can be implemented in digital and/or analog circuitry or the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A communication system, the system comprising a transmitter and a group of recipients, the transmitter being configured to transmit a message and/or a command to the group of recipients, the system being configured to analyze sensor data assigned to each recipient of the group of recipients, the system being further configured to automatically select one recipient of the group of recipients based on the sensor data analyzed such that it is analyzed which of the different recipients is the best match for the respective message and/or command transmitted by the transmitter, the selected recipient being configured to automatically respond to the transmitted message and/or command, wherein the recipient, while responding to the transmitted message and/or command, checks previously whether the recipient is capable of providing a respective service being requested that is assigned to the transmitted message or command, the automatic response being assigned to an acceptance or a deny, the system being further configured to automatically rank all recipients of the group, the communication system being configured to process automatically the message and/or command and to respond automatically to the message and/or command based on automatically sensed sensor data that is analyzed such that no manual routing is necessary.

2. The communication system according to claim 1, wherein at least one recipient of the group of recipients is configured to provide a manual interaction such that a manual response is outputted.

3. The communication system according to claim 1, wherein the sensor data comprises data related to the position of each recipient of the group of recipients.

4. The communication system according to claim 1, wherein the transmitter comprises a positioning circuit.

5. The communication system according to claim 1, wherein the transmitter is established by a mobile device.

6. The communication system according to claim 1, wherein the mobile device has a telephone circuit.

7. The communication system according to claim 1, wherein the system is configured to automatically set up a hunting group based on status information of the recipients of the group of recipients.

8. The communication system according to claim 1, wherein the system comprises a deputy or replacement management module that is configured to provide a deputy or replacing recipient from the group of recipients.

9. A communication system, the system comprising a transmitter and at least one recipient having at least one sensor and a command progress calculation circuit, the transmitter being configured to transmit a command to the at least one recipient, the command initiating an action on the at least one recipient, the command transmitted comprising a sensor activation signal configured to activate the at least one sensor of the at least one recipient, the command progress calculation circuit being configured to calculate the command progress on the at least one recipient such that the recipient calculates the progress on its own, the at least one recipient being configured to transmit a response indicating the command progress on the recipient such that a user of the transmitter is informed about the progress of the command submitted.

10. The communication system according to claim 9, wherein the sensor activation signal encompassed in the command transmitted is predefined or set manually by user interaction.

11. The communication system according to claim 9, wherein the command is a message in a messenger service.

12. A communication system, the system comprising a transmitter that has at least two transmitter accounts, the transmitter being configured to analyze a message to be transmitted, the transmitter further comprising a selection circuit that is configured to select one of the at least two transmitter accounts for transmitting the message based on the analysis of the message to be transmitted, the communication system providing an automatic selection of transmitter accounts which is based on analyzing the message to be transmitted such that no manual selection is necessary.

13. The communication system according to claim 12, wherein the selection circuit is configured to select the transmitter account based on at least one of message type, message content, a predefined sign in the message, a receiver address and a subject of the message.

14. The communication system according to claim 12, wherein the message type is set manually and/or defined by different optical signs.

* * * * *